US007004475B2

(12) United States Patent
McHale et al.

(10) Patent No.: US 7,004,475 B2
(45) Date of Patent: Feb. 28, 2006

(54) FLOW DAM DESIGN FOR LABYRINTH SEALS TO PROMOTE ROTOR STABILITY

(75) Inventors: Matthew J. McHale, Oviedo, FL (US); Lewis Gray, Winter Springs, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 37 days.

(21) Appl. No.: 10/672,192

(22) Filed: Sep. 26, 2003

(65) Prior Publication Data

US 2005/0067789 A1 Mar. 31, 2005

(51) Int. Cl.
*F16J 15/44* (2006.01)
*F16J 15/447* (2006.01)
*F04D 29/66* (2006.01)
*F04D 29/08* (2006.01)

(52) U.S. Cl. ...................... 277/411; 277/412; 277/416; 415/119; 415/173.5

(58) Field of Classification Search ................ 277/409, 277/411–412, 416, 421; 415/119, 173.5, 415/173.6, 174.35, 230
See application file for complete search history.

(56) References Cited

U.S. PATENT DOCUMENTS 4,082,296 A 4/1978 Stein
4,103,905 A 8/1978 Desmond et al.
4,239,452 A * 12/1980 Roberts, Jr. .............. 415/173.5
4,273,510 A 6/1981 Ambrosch et al.
4,370,094 A 1/1983 Ambrosch et al.
4,420,161 A 12/1983 Miller
4,979,755 A 12/1990 Lebreton
5,002,288 A 3/1991 Morrison et al.
5,080,556 A 1/1992 Carreno
5,211,535 A 5/1993 Martin et al.
5,344,160 A 9/1994 Scarlata et al.
5,439,347 A 8/1995 Brandon
5,540,447 A 7/1996 Shultz et al.
5,707,064 A * 1/1998 Vance ..................... 415/174.5
5,794,942 A * 8/1998 Vance et al. ................ 277/303
5,971,400 A 10/1999 Turnquist et al.
6,168,377 B1 1/2001 Wolfe et al.
6,517,314 B1 2/2003 Burnett et al.
6,558,118 B1 5/2003 Brisson et al.

* cited by examiner

*Primary Examiner*—Vishal Patel

(57) ABSTRACT

A method and apparatus for reducing steam swirl in a steam turbine. A plurality of seal segments (14) are circumferentially juxtaposed to form a seal ring (12) encircling the turbine shaft (10), each seal segment (14) supporting a plurality of circumferentially disposed annular seal fins (20) to limit axial steam flow along the shaft (10). A plurality of flow dams (40) are disposed within grooves (42) defined in the plurality of seal fins (20) and seal segments (14) for limiting circumferential steam flow and thereby reducing rotor instability.

15 Claims, 4 Drawing Sheets

FLOW DAM DESIGN FOR LABYRINTH SEALS TO PROMOTE ROTOR STABILITY

FIELD OF THE INVENTION

This invention relates generally to a sealing apparatus for steam turbines and specifically to a labyrinth seal apparatus for reducing turbine steam whirl.

BACKGROUND OF THE INVENTION

A steam turbine for the generation of electrical power comprises a casing enclosing a rotating shaft (also referred to as a rotor) and a plurality of radially extending rows of blades affixed to the shaft. Pressurized steam directed onto the blades causes blade and shaft rotation. The serial steam path typically includes a steam inlet, a plurality of steam pressure zones within the turbine and a steam outlet.

The shaft of a steam turbine for generating electrical power is rotatably coupled to a rotating shaft of an electric generator such that rotation of the turbine shaft imparts rotational energy to the generator shaft. The generator comprises first conductive windings disposed on the shaft and responsive to a source of electrical energy, and second conductive windings disposed in a stator surrounding the shaft. Rotation of the generator shaft and the windings disposed thereon induces electrical current in the second conductive windings according to known electromagnetic voltage induction principles.

Typically, the turbine is segregated into a plurality of pressure zones between successive stages of stationary and rotating blade rows. The purpose of such turbine blade geometries and configurations is to maximize the energy derived from the steam flow, thus increasing the efficiency of the electrical generating plant, i.e., the steam turbine operative in combination with the electric generator.

All regions where the steam turbine shaft penetrates the turbine casing must be sealed to prevent the escape of pressurized steam from the casing. Further, to improve turbine efficiency and minimize shaft vibratory motion, it is desirable to avoid steam leakage along the shaft between adjacent zones of differential pressure surrounding the stationary and rotating blade rows.

It is therefore known to attach circumferential labyrinth seals to the turbine casing surrounding the turbine shaft to minimize axial steam-path leakage while providing sufficient clearance between the shaft and the seals to allow unimpeded shaft rotation. Two types of labyrinth seals are known. A first type comprises sealing fins mounted directly to the turbine casing. A second type comprises fins mounted in arcuate spring-backed seal carrier segments, wherein a plurality of such segments are arranged to form a circular labyrinth seal ring surrounding the turbine shaft and mounted within the casing. Generally, between four and twenty seal segments are required to circumferentially surround the turbine shaft. The spring-backed mechanism urges the fins of each segment radially inwardly toward the shaft.

Both types of labyrinth seals are disposed at selected axial positions along the length of the turbine shaft to minimize steam leakage between regions of differential pressure. The teachings of the present invention relate primarily to the spring-backed seal segments due to the smaller seal clearances associated therewith, but the teachings can also be applied to the sealing fins mounted to the turbine casing.

Each labyrinth seal ring includes a plurality of substantially parallel spaced-apart annular teeth, also known as seal fins, extending radially inwardly from the seal carrier segments mounted to the turbine casing. The distal end of each seal fin is disposed proximate the rotating turbine shaft, leaving a small clearance therebetween. A minimal clearance between the seal fins and the turbine shaft minimizes axial seal leakage and thus the leakage steam flow between differential pressure regions. Similar seals are also utilized to prevent steam leakage from regions where the turbine shaft penetrates the casing.

The seal fins act as flow constrictions, such that multiple parallel seal fins act in concert to reduce the axial steam flow leakage between differential pressure zones to acceptable levels. It is known, however, that notwithstanding the use of the labyrinth seal rings, some steam continuously enters and exits the seal rings with a flow component directed generally axially along the shaft.

It is also known that a component of the steam flow enters and exits the labyrinth seal ring structure in a circumferential direction, typically referred to as "steam swirl." It is generally accepted that the swirl results from two principal causes: (1) a circumferential steam flow component imparted by steam exiting the most adjacent upstream (i.e., in the direction of higher steam pressure) turbine stage; and (2) a circumferential flow component produced by a frictional effect of the rotating shaft. The latter component is in the direction of rotor rotation, unless the rotor shaft speed is less than the steam velocity leaving the upstream blade, and is referred to as a forward running swirl. The former component is always in the direction of rotor rotation When the turbine rotor is centered within a seal ring, the local circumferential steam leakage flow velocities are substantially equivalent at all points around the rotor circumference. Thus there is no net steam force to urge the rotor from its axial center of rotation. On the contrary, if the rotor is off-center, an area of a seal chamber (i.e., a region bounded by two successive seal fins and the adjacent region of the turbine rotor) increases in one circumferential region of the rotor and decreases in a diametrically opposite region. The steam experiences a higher drag force in the region of decreased size than in the region of increased size. The differential drag forces induce a net pressure difference, pushing the rotor in the direction of rotation around the center of the seal. Thus the rotor "whirls" about its geometric center.

The rotor whirl responds primarily to the entering swirl velocity and the steam density. When the turbine load increases, the destabilizing forces created by the swirl also increase with increasing steam density, as does the amplitude of the rotor whirl. The rotor whirl increase is monotonic with increasing turbine load, and can eventually exceed acceptable turbine vibration amplitude limits, requiring the operator to reduce the turbine load. This condition is exhibited as a high vibration amplitude at the bearings, exceeding normal operating limits.

One prior art approach for limiting rotor instability by reducing rotor swirl is disclosed in U.S. Pat. No. 4,979,755 entitled "Flow Dams in Labyrinth Seals to Improve Rotor Stability". FIG. 1 herein illustrates certain pertinent elements of a steam turbine including a rotating shaft or rotor 10 conventionally extending through regions of varying pressure within the turbine, from a region of higher fluid pressure to a region of lower fluid pressure, and including a flow dam according to the '755 patent. The shaft 10 in FIG. 1 represents a portion of the rotating shaft (the blades are not shown in FIG. 1) that extracts rotational energy from the pressurized steam directed to the blades.

A portion of two seal rings 12 (only two are illustrated for exemplary purposes in FIG. 1) are disposed axially along and circumferentially surrounding the shaft 10. The number of seal rings utilized in a turbine depends on various operational factors including the pressure to be sealed and the desired sealing efficiency.

Each seal ring includes a plurality of curved seal ring segments 14. In one embodiment, each of the seal ring segments subtends a 90° circumferential arc and thus a seal ring comprises four circumferentially adjacent seal ring segments 14. In other embodiments, the seal ring comprises more than four seal ring segments for surrounding the shaft 10. The seal rings 12 circumferentially surround the shaft 10 to minimize fluid leakage between regions of differential pressure through which the shaft 10 extends. For example, the seal rings 12 may form shaft end seals for a high-pressure end of a conventional steam turbine. Each seal segment 14 fits within a corresponding groove 16 formed in a stationary portion or casing 18 of the turbine.

Each seal segment 14 includes a biased backing member (not shown) to urge the seal segment 14 radially inwardly toward the shaft 10 by applying a force between mating surfaces 19A of the seal segment 14 and surface 19B of the stationary portion 18. Each seal segment 14 further comprises a shoulder 14A to limit inwardly directed travel of the seal segment 14.

A plurality of substantially parallel spaced-apart annular seal fins 20 are mounted on a radially inward face 14B of each seal segment 14. The annular seal fins 20, which are also referred to as seal legs, strips or teeth, surround the shaft 10 to provide a barrier against axial steam flow. The seal fins 20 are formed either as an integral element of the seal segment 14 or are retained by known peening, caulking or frictional techniques within slots formed in the seal segment 14.

The fins 20, typically constructed of stainless steel, are not intended to contact the shaft 10, but extend radially inward to within a relatively close proximity thereof to maintain a small working clearance between the shaft 10 and the fins 20. In one embodiment, this clearance is about 0.030 inches. An annular chamber or cavity 22 is defined between two successive fins 20.

In another embodiment the fins 20 can be mounted opposite raised lands (not shown) on the rotating shaft 10 to provide the axial sealing.

As described above, steam flowing circumferentially with respect to the shaft 10 within the cavities 22 can have a destabilizing effect on the shaft or rotor, creating rotor whirl when the steam flow is in the same direction as rotor rotation and when an eccentricity is present in the seal radial clearance.

To reduce steam swirl flow that can lead to the destabilizing rotor whirl, each seal segment 14 further comprises a flow dam 26 affixed to an end surface of a seal segment 14. Each seal segment 14 may further comprise a plurality of threaded bores for engagement with correspondingly threaded fasteners, such as flat-head machine screws 30 as shown in FIG. 1 to affix the flow dam 26 to an end surface. Each of the flow dams 26 is mounted perpendicularly to the seal fins 20 and attached to the seal segment 14 by insertion of the screws 30 into the threaded bores. The flow dams 26 substantially reduce the circumferential fluid flow in the cavities 22, thereby reducing the steam swirl condition.

In this prior art technique for limiting steam swirl and thus rotor whirl, the number of flow dams 26 is limited to the number of seal segments 14 comprising a circumferential seal ring 12, since each seal segment 14 accommodates one flow dam 26. Thus for example in the embodiment where four circumferentially adjacent seal segments 14 comprise a seal ring 12, only four flow dams 26 can be accommodated. This limitation may not, in some applications, sufficiently reduce the steam swirl, as the swirl reduction is directly dependent on the number of flow dams disposed around the shaft circumference. Swirl reduction also depends on the degree to which each flow dam closes off the cavity 22, i.e., the degree to which the flow dam reduces the gap between the shaft 10 and a radially inwardly facing edge 26A of the flow dam 26.

BRIEF SUMMARY OF THE INVENTION

The invention comprises a labyrinth seal for a steam turbine having a stationary housing through which extends a rotating element, wherein the steam turbine includes steam flow regions of differential pressure. The labyrinth seal comprises a seal ring comprising a plurality of adjacent seal segments adapted to be attached to the stationary housing and a plurality of axially spaced-apart seal fins supported by the plurality of seal segments, wherein each one of the plurality of seal fins extends radially inwardly toward the rotating element. At least two of the plurality of seal fins define a fin groove therein. A flow dam is disposed within the fin groove and extends radially inwardly toward the rotating element.

The invention further comprises a method for reducing circumferential steam flow in a steam turbine having a stationary housing through which extends a rotating element, wherein the steam turbine includes steam flow regions of differential pressure. The method comprises forming a plurality of axially spaced-apart circumferential seal fins extending radially inwardly toward the rotating element, and forming a fin groove in each one of the seal fins. A flow dam is disposed within the fin grooves, wherein the flow dam extends radially inwardly toward the rotating element.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
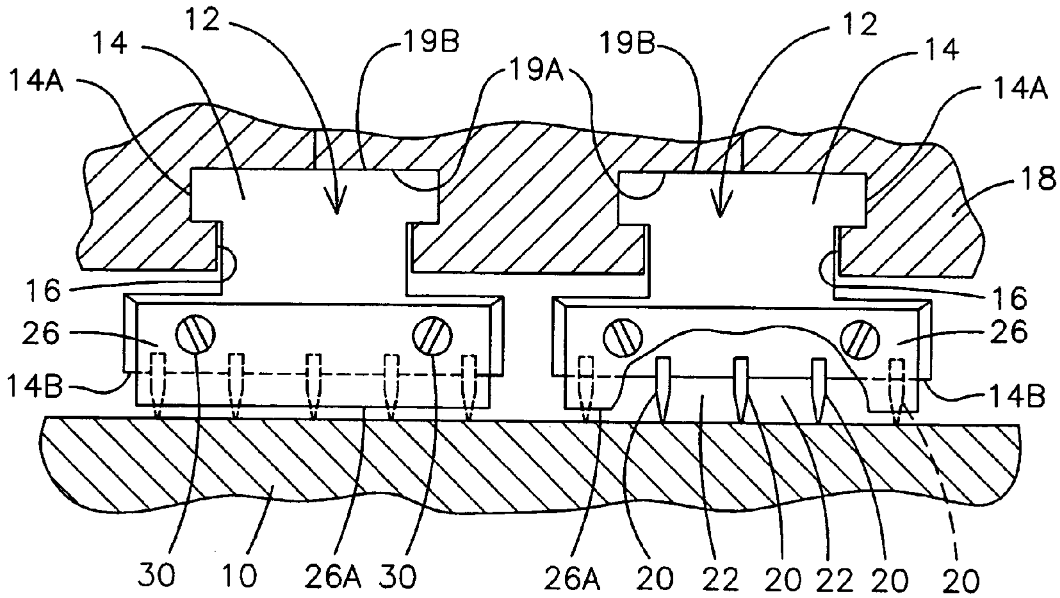
FIG. 1 illustrates an axial cross-sectional view of a prior art turbine seal segment including flow dams.

Before describing in detail the particular seal ring system and method in accordance with the present invention, it should be observed that the present invention resides primarily in a novel and non-obvious combination of hardware elements and method steps. Accordingly, these elements and steps have been represented by conventional elements and steps in the drawings, showing only those specific details that are pertinent to the present invention so as not to obscure the disclosure with details that will be readily apparent to those skilled in the art having the benefit of the description herein.

It is therefore desirable to provide a method and apparatus for further minimizing steam whirl in turbines by permitting placement of the flow dams at any desired circumferential location. According to the teachings of the present invention, flow dams 40 (see FIG. 2) can be installed at a plurality of circumferentially spaced-apart locations surrounding the shaft 10 by retaining the flow dams 40 in axial slots or grooves formed in the annular seal fins 20. Known staking, caulking and/or peening operations can be employed to retain the flow dams 40 within the grooves.

In another embodiment, slots for receiving the flow dams 40 are also formed in the seal segments 14. In this embodiment a slot depth is approximately equal to the depth of slots retaining the annular seal fins 20. The slot width is controlled to provide a close fit for the flow dams 40, which are retained within the slots by known staking, caulking and/or peening operations.

The flow dams are formed from either conventional (tapered) seal strip stock or, preferably, from parallel-sided (i.e., flat) stock.

Figure 2:
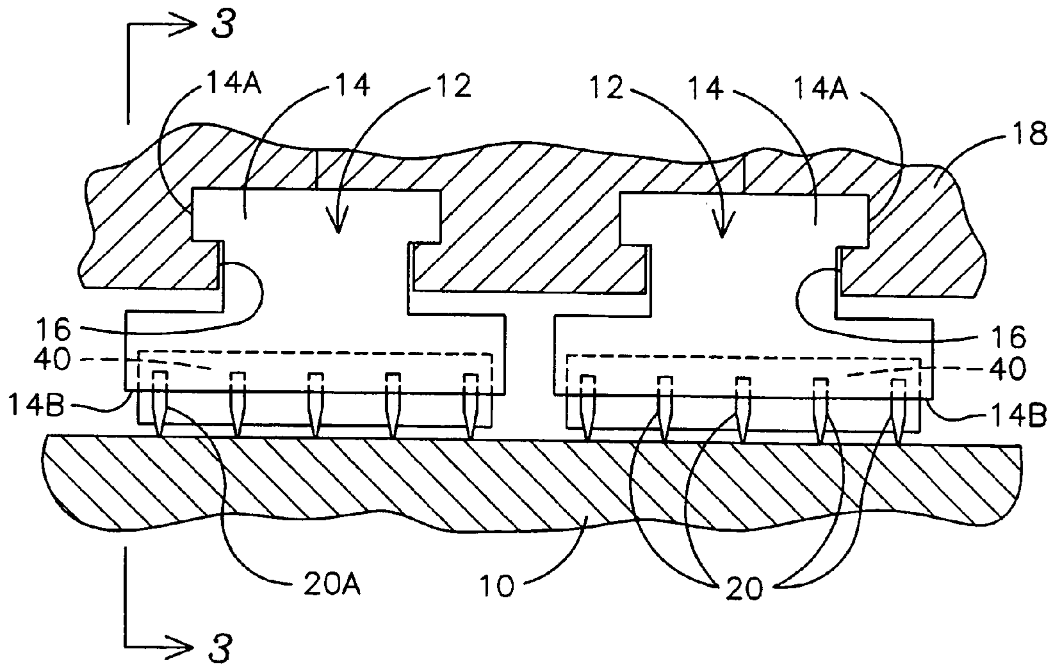
FIG. 2 illustrates an axial cross-sectional view of a turbine seal segment according to the teachings of the present invention.
Figure 3A:
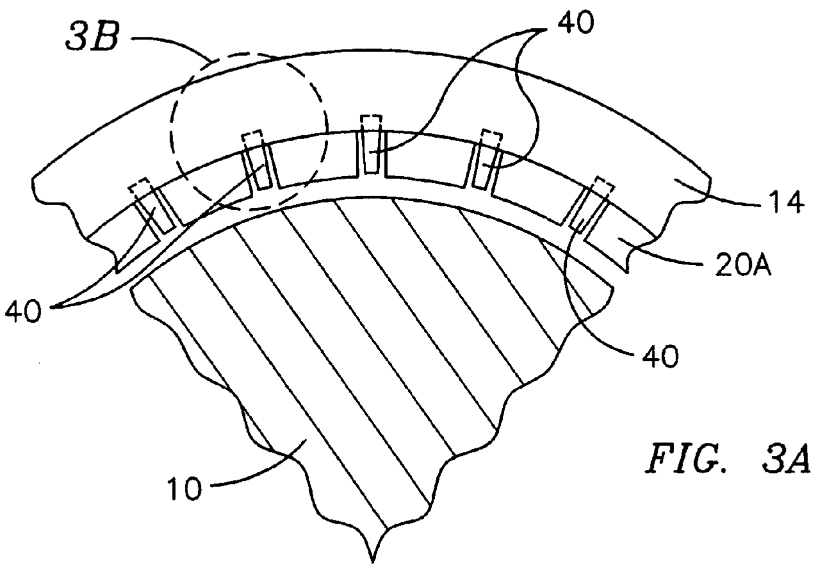
FIGS. 3A and 3B illustrate a radial view of a turbine seal segment according to the teachings of the present invention.
Figure 3B:
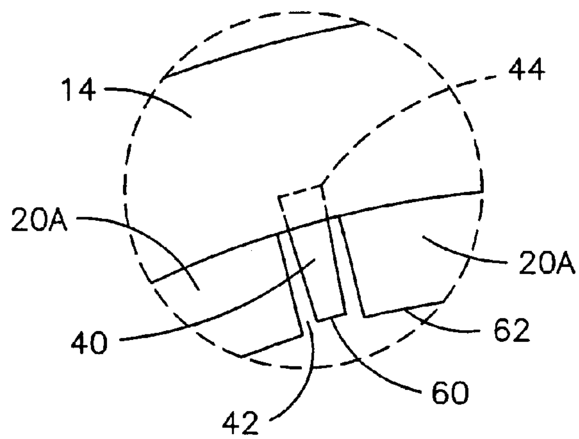

FIG. 3A is a radial cross-sectional view along the plane 3—3 of FIG. 2, with the stationary portion 18 of the turbine removed for clarity. FIG. 3A illustrates an annular seal fin 20A (the leftmost seal fin 20A in FIG. 2), with additional annular seal fins disposed behind the seal fin 20A and thus not illustrated in FIG. 3A. Flow dams 40 are disposed in aligned grooves 42 in the seal fins 20, including the seal fin 20A. The flow dams 40 are retained within slots 44 in the seal segments 14 by known staking/peening or caulking techniques. See the close-up view of FIG. 3B.

Figure 4:
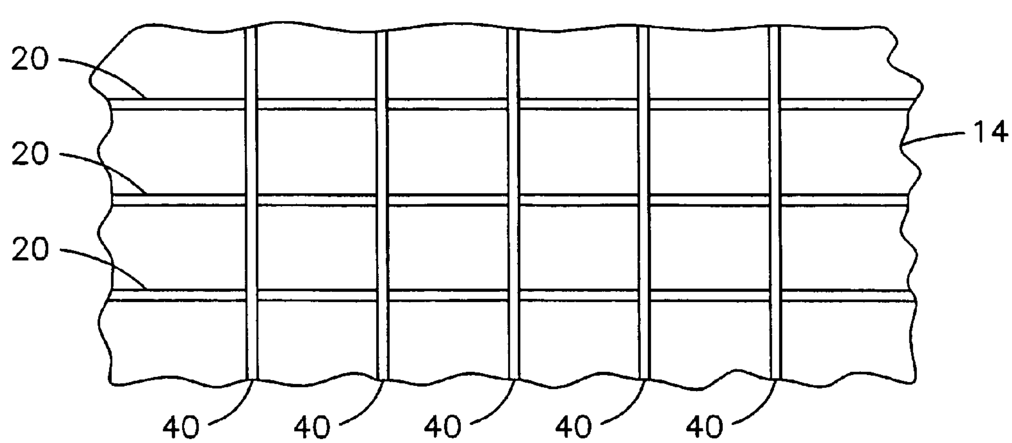
FIG. 4 illustrates a radially outward view of the seal segment of FIGS. 3A and 3B.

FIG. 4 depicts an inside surface (i.e., the surface observed when looking radially outwardly from the center of the shaft 10) of a seal segment 14, depicting a plurality of parallel seal fins 20 and flow dams 40 perpendicular thereto. The seal fins 20 are oriented generally perpendicular to the axis of the rotating shaft (not shown in FIG. 4). Although the dams 40 are shown as equally spaced, this is not necessarily required for the present invention. Also, in another embodiment not illustrated, the flow dams 40 can be disposed at an angle other than 90° relative to the seal fins 20. An angle other than 90° may be employed to avoid interference between the flow dam 40 and other features of the sealing structures (such as avoiding interference with angled anti-swirl vanes described below in conjunction with FIG. 8). However, a perpendicular orientation is preferred as the most effective orientation to reduce steam swirl.

According to the present invention, multiple flow dams 40 can be disposed at arbitrary intervals at any circumferential location around the shaft 10. Any number of flow dams 40 can be employed to reduce swirl as the number is not limited by the number of seal segments 14, as disclosed by the prior art.

In one embodiment each flow dam 40 is restrained along its entire length in the plurality of grooves 42 formed within consecutive annular seal fins 20, limiting dam deflection and resulting distortion that can occur under rub conditions, i.e., where a flow dam 40 contacts the rotating shaft 10.

The teachings of the present invention are easily adaptable to retrofit applications for existing turbines. Replacement seal fins 14 can be fabricated with the flow dams 40, resulting in improved swirl conditions after a retrofit operation.

Figure 5:
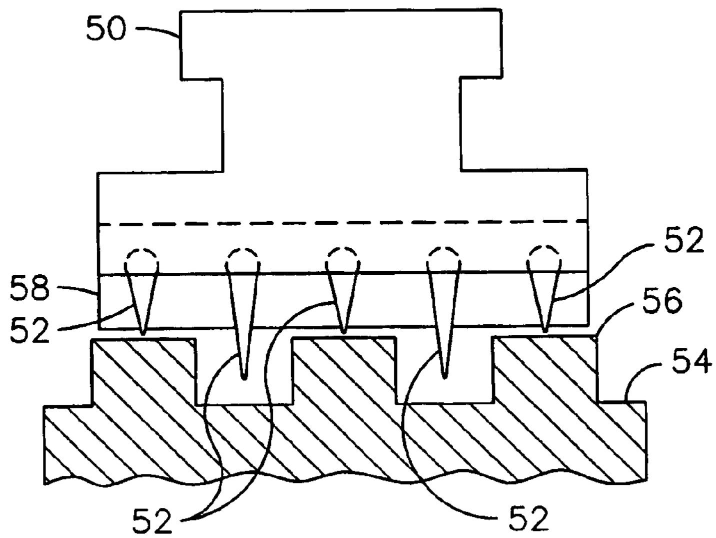
FIG. 5 illustrates an axial cross-sectional view of a turbine seal segment including a flow dam according to an alternative embodiment of the present invention.

FIG. 5 illustrates an application of the teachings of the present invention to a seal segment 50 supporting a plurality of different length annular seal fins 52 for use with a stepped rotating shaft 54. In this embodiment, the rotating shaft 54 comprises a stepped circumference 56 and thus the annular fins 52 are formed of varying lengths consistent with the circumferential variations. A flow dam 58 is disposed within grooves formed in the annular fins 52 and/or grooves formed within the seal segment 50. As in the embodiments above, several such flow dams 58 can be circumferentially spaced apart around the shaft 54.

In one embodiment, the flow dams 40 and 58 are formed from flat seal stock, which provides improved dam support over the full radial height of the dam when compared with tapered seal stock. The flat stock also offers improved resistance against flexure and distortion in the event operating conditions result in a reduction in radial clearance between the dams 40/58 and the rotating shaft 10, leading to a rub condition. It is desired to limit the possibility of a dam rub condition by recessing an edge 60 of the flow dam 40 (see FIG. 3B) below an edge 62 of the annular seal fin 20A. Thus the radial height of the annular fins 20 is greater than the radial height of the flow dams 40. This approach also accommodates circumferential variations in the radial height of the annular seal fin 20, which can occur when the fins 20 are each subjected to a separate final machining operations.

Figure 6:
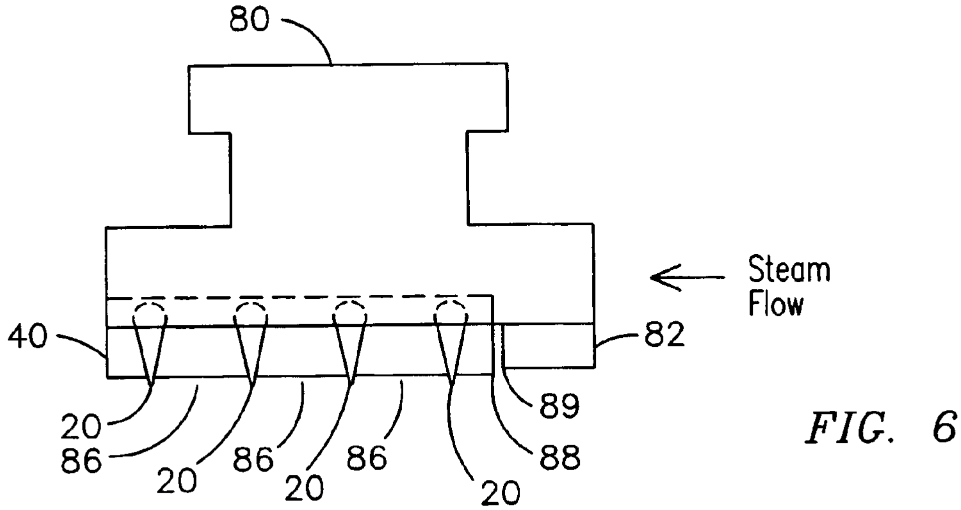
FIGS. 6 and 7 are two views illustrating a turbine seal segment including a flow dam according to another embodiment of the present invention.
Figure 7:
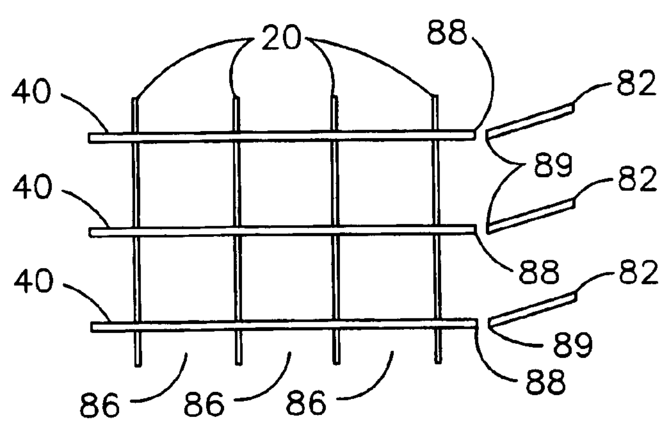

In yet another embodiment illustrated in FIGS. 6 and 7, a seal ring comprises a plurality of seal segments 80 (only one seal segment 80 is illustrated in FIGS. 6 and 7), a plurality of seal fins 20, a plurality of flow dams 40 and a plurality of pre-swirl conditioning vanes 82 at a steam inlet end of the seal segment 80. FIG. 7 is bottom view of FIG. 6 or a view looking radially outwardly from the shaft 10 (which is not illustrated in FIGS. 6 and 7). The pre-swirl conditioning vanes 82 reduce swirl in the leakage flow at the steam entrance to the seal ring comprising the seal segments 80. However, the vanes 82 may be unable to maintain low swirl conditions in cavities 86 between successive annular seal fins 20, thus suggesting use of the flow dams 40. In one embodiment, a steam inlet edge 88 of the flow dams 40 is spaced apart from an exit edge 89 of the pre-swirl vanes 82. In this way, blockage of the passages between the pre-swirl vanes 82 is avoided.

Figure 8:
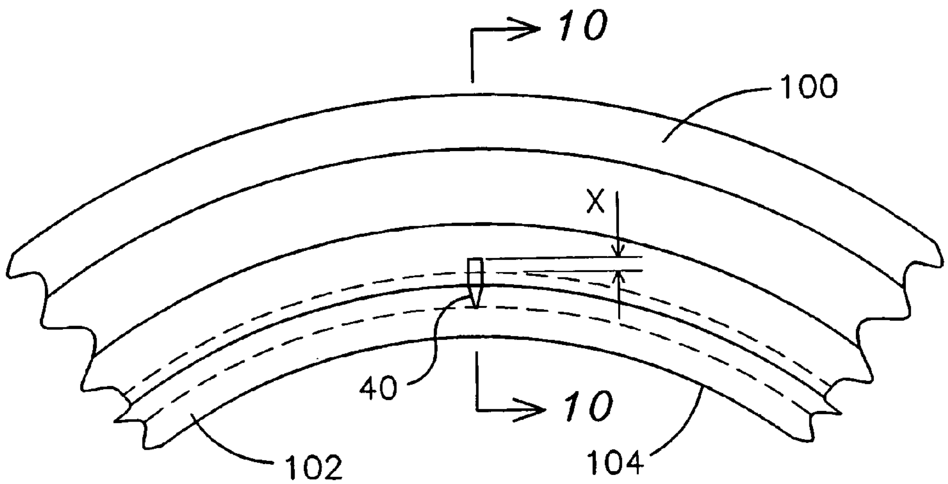
FIG. 8 illustrates a radial view of a turbine seal segment according to the teachings of the present invention.
Figure 9:
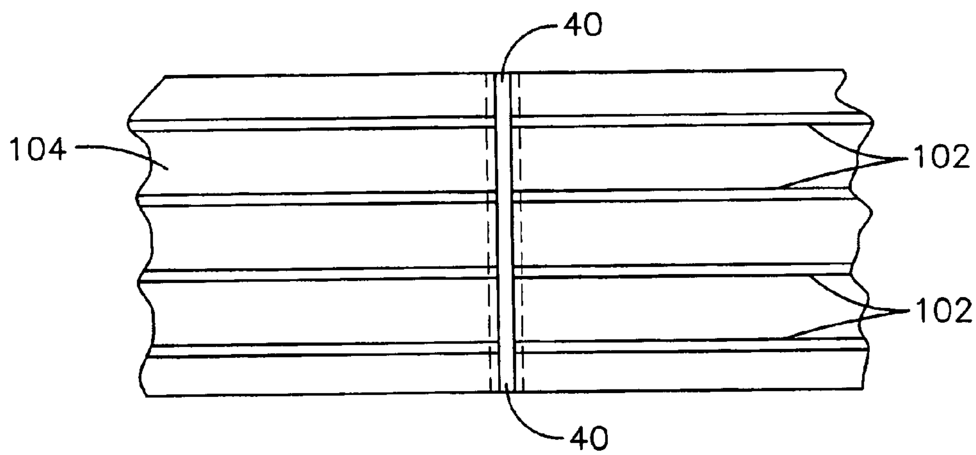
FIG. 9 illustrates a bottom view of the seal segment of FIG. 8.
Figure 10:
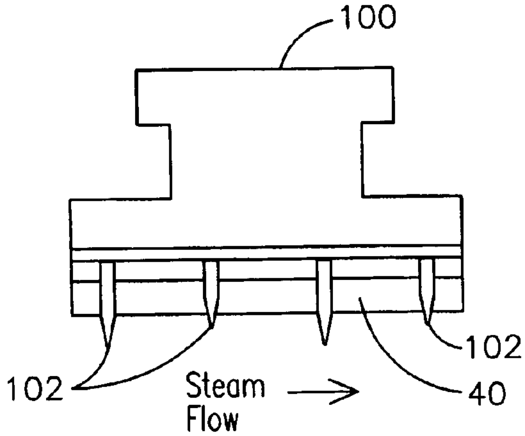
FIG. 10 illustrates a cross-sectional view of the seal segment of FIG. 8.

FIG. 8 illustrates the flow dam 40 affixed to a seal segment 100, comprising a plurality of seal fins 102. FIG. 9 is a view of an inwardly radially directed surface 104 of the seal segment 100. FIG. 10 is a cross-sectional view along the plane 10—10 of FIG. 8. To install the flow dam 40, a axial groove is formed through the seal fins 102. Generally, the axial groove width is substantially identical to a width of the radial grooves in which the seal fins 102 are mounted. However the axial groove for receiving the flow dams 40 is deeper by a distance “x” illustrated in FIG. 8. In one embodiment “x” is about 0.030 inches. The flow dam 40 is installed across the width of the seal segment 100 and retained in the axial groove.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt the teachings of the present invention to a particular situation without departing from the invention's scope. Therefore, it is intended that the invention not be limited to the particular embodiment disclosed as the best mode contemplated for carrying out this invention, but that the invention will include all embodiments falling within the scope of the appended claims.

What is claimed is:

1. A labyrinth seal for a steam turbine having a stationary housing through which extends a rotating element, wherein the steam turbine includes steam flow regions of differential pressure, the labyrinth seal comprising:

a seal ring comprising a plurality of adjacent seal segments adapted to be attached to the stationary housing;

a plurality of axially spaced-apart seal fins supported by the plurality of seal segments, wherein each one of the plurality of seal fins extends radially inwardly toward the rotating element, at least two of the plurality of seal fins defining a fin groove in the seal fins; and a flow dam disposed within the fin groove and extending radially inwardly toward the rotating element.

2. The labyrinth seal of claim 1 wherein at least one of the plurality of seal segments defines a segment groove therein, and wherein the fin groove is aligned with the segment groove, and wherein the flow dam is disposed within the segment groove and the aligned fin groove.

3. The labyrinth seal of claim 2 wherein the flow dam is retained within the segment groove by one or more of peening, caulking or frictional forces.

4. The labyrinth seal of claim 1 wherein the flow dam is oriented perpendicular to the plurality of seal fins.

5. The labyrinth seal of claim 1 further comprising a fin groove defined in each one of the plurality of seal fins, and wherein the flow dam is disposed within the fin grooves.

6. The labyrinth seal of claim 1 further comprising a plurality of fin grooves defined in each one of the plurality of seal fins, and a like plurality of flow dams, wherein a one of the plurality of flow dams is disposed within each one of the plurality of fin grooves.

7. The labyrinth seal of claim 6 wherein the plurality of fin grooves comprises a plurality of aligned fin grooves, such that the plurality of flow dams are substantially parallel when disposed within each one of the plurality of fin grooves.

8. The labyrinth seal of claim 1 wherein the rotating element comprises a rotating shaft.

9. The labyrinth seal of claim 1 wherein a radial height of the plurality of seal fins is greater than a radial height of the flow dam.

10. The labyrinth seal of claim 1 further comprising a plurality of conditioning vanes supported by the plurality of seal segments and axially spaced apart from the plurality of seal fins.

11. A labyrinth seal for a steam turbine having a stationary housing through which extends a rotating element, wherein the steam turbine includes steam flow regions of differential pressure, the labyrinth seal comprising:

a seal ring comprising a plurality of N adjacent seal segments adapted to be attached to the stationary housing;

a plurality of axially spaced-apart seal fins supported by the N seal segments, wherein the plurality of seal fins extend radially inwardly toward the rotating element, the plurality of seal fins defining fin grooves in the seal fins; and at least 2N+1 flow dams disposed within the fin grooves.

12. A labyrinth seal for a steam turbine having a stationary housing through which extends a rotating element, wherein the steam turbine includes steam flow regions of differential pressure, the labyrinth seal comprising:

a seal ring comprising a plurality of N adjacent seal segments adapted to be attached to the stationary housing;

a plurality of axially spaced-apart seal fins supported by the plurality of seal segments, wherein each one of the plurality of seal fins extends radially inwardly toward the rotating element, the plurality of seal fins defining at least N+1 fin grooves therein; and a flow dam disposed within the at least N+1 fin grooves and extending radially inwardly toward the rotating element.

13. A method for reducing circumferential steam flow in a steam turbine having a stationary housing through which extends a rotating element, wherein the steam turbine includes steam flow regions of differential pressure, the method comprising:

forming a plurality of axially spaced-apart circumferential seal fins extending inwardly toward the rotating element:

forming a fin groove in each one of the seal fins; and disposing a flow dam within the fin grooves, wherein the flow dam extends radially inwardly toward the rotating element.

14. The method of claim 13 wherein the flow dam is oriented perpendicular to the plurality of seal fins.

15. The method of claim 13 wherein the step of forming a fin groove further comprises forming a plurality of fin grooves in each one of the plurality of seal fins, and wherein the step of disposing a flow dam further comprises disposing one of a like plurality of flow dams an a groove in each one of the plurality of seal fins.

* * * * *